(12) United States Patent
Fries

(10) Patent No.: US 6,356,742 B1
(45) Date of Patent: Mar. 12, 2002

(54) ADAPTIVE PRECORRECTION OF SIGNAL COMBINERS USING PASSIVE HYBRID JUNCTION SAMPLE CANCELLATION

(75) Inventor: Henry Fries, Westfield, MA (US)

(73) Assignee: Thomcast Communications, Inc., Southwick, MA (US)

( * ) Notice: Subject to any disclaimer, the term of this patent is extended or adjusted under 35 U.S.C. 154(b) by 0 days.

(21) Appl. No.: 09/385,039

(22) Filed: Aug. 30, 1999

(51) Int. Cl.[7] .................................................. H04B 7/00
(52) U.S. Cl. ..................... 455/91; 455/114; 375/296; 375/297; 348/608; 348/723
(58) Field of Search .......................... 455/91, 63, 67.3, 455/114; 348/738, 608, 723, 724; 333/26, 122; 375/296, 297; 330/149

(56) References Cited

U.S. PATENT DOCUMENTS

| | | | | |
|---|---|---|---|---|
| 3,818,385 A | * | 6/1974 | Mouw | 333/26 |
| 4,413,242 A | * | 11/1983 | Reeves et al. | 333/122 |
| 4,672,452 A | * | 6/1987 | Corbet et al. | 348/608 |
| 5,198,904 A | * | 3/1993 | Ta et al. | 348/738 |
| 5,703,531 A | * | 12/1997 | Vaughn et al. | 330/149 |
| 5,745,006 A | * | 4/1998 | Budnik et al. | 330/149 |
| 5,850,162 A | * | 12/1998 | Danielsons | 330/149 |
| 6,275,685 B1 | * | 8/2001 | Wessel et al. | 455/126 |

* cited by examiner

Primary Examiner—Dwayne Bost
Assistant Examiner—John Telesco
(74) Attorney, Agent, or Firm—Rothwell, Figg, Ernst & Manbeck

(57) ABSTRACT

A circuit and method for adaptive precorrection of first signals applied to RF signal combiners of a broadcast signal transmitter provides a sample of the combined signal output of the RF combiner and a sample of a second signal to a hybrid so as to cancel from the combined signal the second signal, and to apply the resulting signal sample representing the first signal to an adaptive precorrector which precorrects the first signal before it is applied to the RF combiner. The circuit and method can be used with a two signal combiner, or with a multiple signal combiner.

10 Claims, 2 Drawing Sheets

ADAPTIVE PRECORRECTION OF SIGNAL COMBINERS USING PASSIVE HYBRID JUNCTION SAMPLE CANCELLATION

BACKGROUND OF THE INVENTION

1. Field of the Invention

The present invention relates generally to transmission of broadcast television signals using non-linear devices as high power amplifiers, as well as RF signal combiners for combining two or more signals for propagation through a common propagation device, such as a broadcast tower antenna, and more particularly to methods and systems for precorrecting input signals before they are inputted to a combiner for transmission to an antenna for propagation.

2. Background and Related Art

It is generally known in the art to compensate for distortions introduced to input signals (such as composite television signals) by non-linear devices used to amplify such signals, by precorrecting such signals prior to inputting them to the non-linear device. See, e.g., U.S. Pat. No. 5,198,904.

The benefits of inductive output tubes (IOTs) as power amplifiers in television transmitters, especially in common amplification configurations, are well known in terms of increased efficiency and reliability. However, a characteristic of the IOT which must be compensated for is its nonlinearity.

A correction scheme known as Digital Adaptive Correction (DAP) has been proposed to compensate for signal distortions caused by such non-linear amplifying devices. Pursuant to DAP, the output signal of a non-linear amplifier is measured and compared with an ideal signal at the output of a modulator. The difference between the ideal signal and the measured output signal represents error caused by the non-linear amplifier. This difference could be stored, such as in a Look-Up Table (LUT), against magnitude and/or phase values of the input signal. Thereafter, signals being inputted to the modulator would be measured, the appropriate correction value would be retrieved from the LUT, and applied to the input signal before being amplified by the non-linear device.

Many applications exist where it is desired to combine signals of various frequencies into a common transmission line structure. One example of such an application is in the field of microwave communications. One requirement of such combination is that the different signals must not improperly interfere with each other.

In this regard, various tuned filtering devices have been used in the prior art. However, due to the non-ideal nature of some of such devices, unwanted distortions and losses are inevitably introduced into the frequency bands of the different signals, causing the signals to be degraded in quality.

One particular application for combining electromagnetic signal waves has arisen with the advent of digital television (DTV). Broadcasters who wish to provide DTV service still must provide broadcast signals in the conventional NTSC (National Television Systems Committee) format to accommodate viewers with conventional NTSC television receivers. Absent a feasible and efficient way to combine the DTV signal and the NTSC signal for transmission by a common broadcast antenna (possibly on adjacent frequency channels) without causing unacceptable interference, interaction and distortion of the signals, this will require some broadcasters to build additional antennae and towers to carry their DTV signals. This represents a very expensive and undesirable proposition.

Under present NTSC broadcast allocations, each active channel of 6 MHZ bandwidth is separated from other channels by one or more 6 MHZ wide inactive channels, in order to prevent interchannel interference between signals. Because of the limited nature of the electromagnetic spectrum and the requirement for broadcasters to continue to provide conventional NTSC signals to serve viewers who do not own DTV receivers, DTV signals will, in some cases, be broadcast on currently inactive 6 MHZ wide channels adjacent to the lower and upper sides of current NTSC broadcasting channels.

Recently, highly selective RF signal combiners have been proposed for use in adjacent channel applications. Similar to non-linear devices such as IOTs, however, such signal combiners also can degrade signal performance through the process of signal combination. Use of adaptive precorrection on signals being inputted to RF signal combiners would require that a signal sample be taken at the output of the combiner to be used in the adaptive precorrection circuit. However, because the output of the combiner is by its nature a combined signal consisting of two or more separate broadcast signals, the sample would contain the additional signals along with the desired signal to be precorrected. The presence of such undesired additional signals in the sample will at best significantly degrade the adaptive precorrection, and at worst would completely debilitate the function of the adaptive precorrection circuit. Attempted removal of the undesired signals by filtering is difficult or impossible without distorting the desired signal sample itself.

Consequently, there exists a need in the art to provide precorrection of signals being inputted to RF signal combiners to counteract the degradation of the signals by the signal combiner.

SUMMARY OF THE INVENTION

The present invention provides a solution to the shortcomings of the prior art as discussed above.

In particular, the present invention provides a circuit for precorrecting a first signal in a broadcast signal transmitter for transmitting a combined signal on a common propagation device, including an amplifying device for amplifying a first signal to provide an amplified first signal, an RF combiner for combining the amplified first signal with at least a second signal to provide at an output of the combiner a combined signal for propagation on a propagation device, an adaptive precorrector for receiving the first signal at a first input thereof and precorrecting the first signal for distortions introduced into the first signal by the amplifying device and the RF combiner in accordance with a signal sample received at a second input thereof, an output of the precorrector being applied to the amplifying device, and a hybrid which receives at one input thereof a sample of the combined signal, and which receives at a second input thereof a sample of the second signal in a manner so as to provide at an output thereof a sample of the first signal constituting the signal sample provided to the adaptive precorrector.

According to another aspect of the invention, a method is provided for precorrecting a first signal in a broadcast signal transmitter for transmitting a combined signal on a common propagation device, comprising the steps of combining a precorrected first signal with at least one additional signal to provide a combined signal for propagation on a propagation device, applying to one input of a hybrid a sample of the combined signal, applying at a second input of the hybrid a sample of the at least one additional signal in a manner so as to provide at an output of the hybrid a sample of the first signal, and applying the sample of the first signal to a precorrector which receives the first signal and precorrects the first signal, in accordance with the sample, for distortions introduced into the first signal by the RF combiner, and produces at an output thereof the precorrected first signal which is applied to the RF combiner.

BRIEF DESCRIPTION OF THE DRAWINGS

The invention will be described in detail with reference to the following drawings in which.

DETAILED DESCRIPTION OF THE PREFERRED EMBODIMENTS

Figure 1:
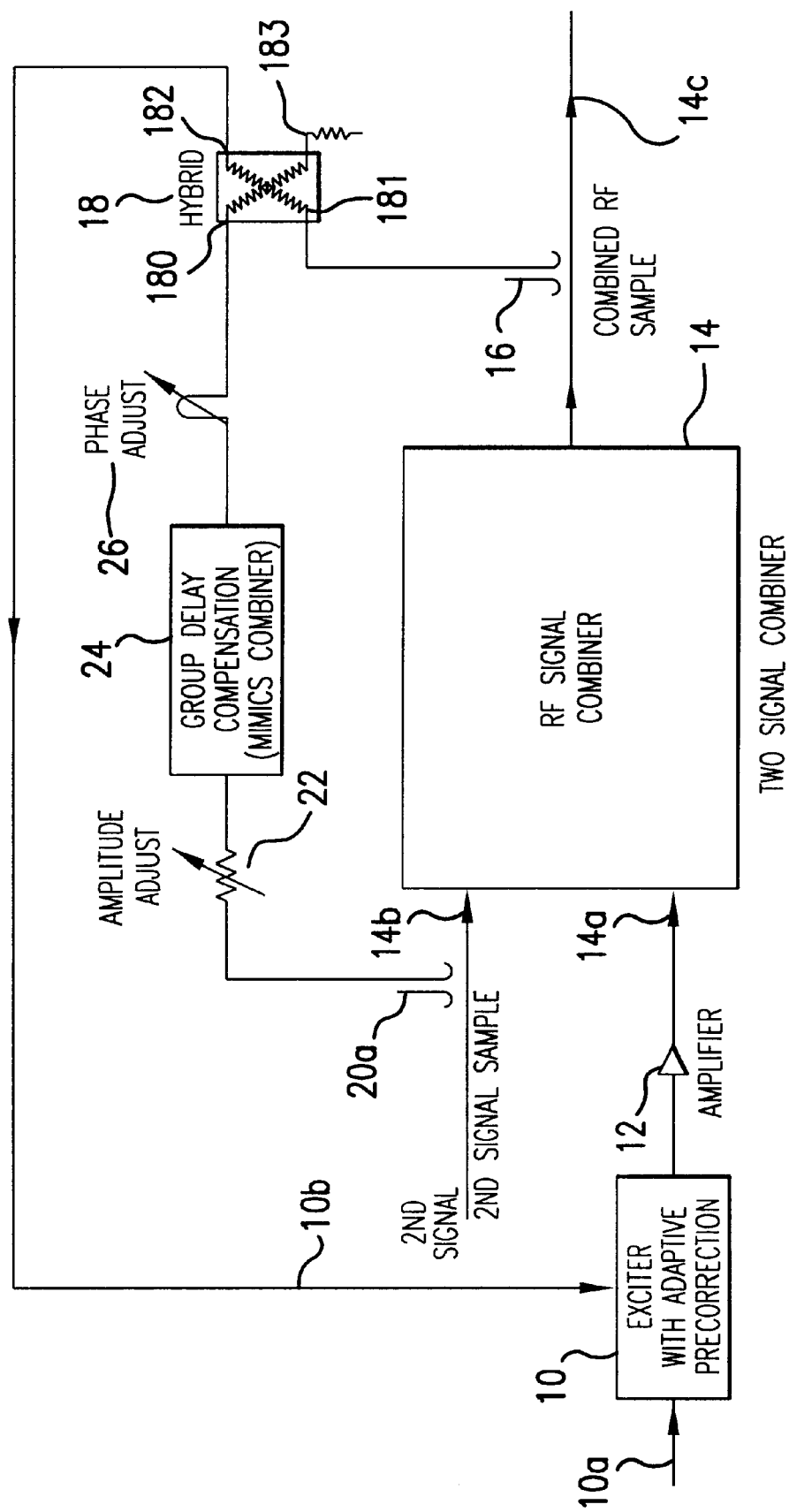
FIG. 1 is a block diagram of a correction circuit implementing the method of the present invention, according to one preferred embodiment.

FIG. 1 is a block diagram of a correction circuit for precorrecting an input signal which is to be amplified by a non-linear amplifying device and combined with a second signal in a radio frequency (RF) combiner according to a first embodiment of the invention.

An input signal, such as a composite or digital television broadcast signal, is inputted at input terminal 10a to an exciter with adaptive precorrection circuit 10. Such precorrection circuits are generally known in the art and as such a detailed explanation of the operation of circuit 10 is not necessary for the understanding of the present invention. To summarize the operation, the precorrection circuit 10 receives a signal sample on signal line 10b and compares the sample with the input signal on line 10a. The presence of distortions in the signal sample 10b cause the precorrection circuit to precorrect the input signal by applying precorrection factors to the input signal such that when the precorrected signal is subjected to distortion by the non-linear amplifying device 12 and the RF combiner 14, the distortion will be cancelled out by the precorrection and the original signal will thus be recovered.

The precorrected input signal is amplified in amplifying device 12 and inputted at input line 14a to RF combiner 14 where it is combined with a second signal inputted to the combiner at input line 14b, to provide a combined RF signal at output line 14c, for propagation on a common propagating device such as a broadcast tower antenna. According to the invention, a sample of the combined RF signal on line 14c is taken at signal coupler 16, and applied to one input port 181 of a hybrid 18.

Hybrid 18, as well known in the art, is a conventional device known alternatively as a hybrid, hybrid junction, "magic tee," or cross-coupled hybrid of the coaxial type. A hybrid junction is generally a four port coaxial or waveguide structure having four terminals or ports so arranged that, when properly terminated in external impedances, couples a signal input at either of its first pair of ports to its second pair of ports, but not to the other of the first pair of ports. Similarly, a signal input at either of the second pair of ports will be coupled to the first pair of ports (having proper load impedances) but not to the other of the second pair of ports. In particular, a signal S entering hybrid 18 at port 180 will divide and emerge from the two adjacent ports 182 and 183 as output signals S, assuming that ports 182 and 183 are terminated with equal appropriate characteristic impedances, but will be unable to reach the opposite port 181. Conversely, if the divided signals encounter the equivalent of short circuits (appropriately phased) at both output ports 182 and 183, the signals will be reflected back into the hybrid junction and will appear recombined as a single signal at port 181. Examples of known hybrid junctions are disclosed, for example, in U.S. Pat. Nos. 3,818,385 and 4,413,242.

A sample is also taken of the second signal on line 14b through coupler 20, and applied to the second input port 180 of the hybrid 18. The amplitude of the second signal is adjusted in an amplitude adjustment circuit 22, and the phase of the second signal is adjusted in phase adjustment circuit 26, so as to provide cancellation of the second signal from the sample taken at coupler 16. If desired or necessary, a group delay compensation circuit 24 also may be provided to emulate the group delay response of the RF combiner to ensure proper cancellation of the second signal.

The port 183 being terminated to ground, the desired signal sample (having the second signal cancelled from the combined RF signal) will split and appear at the output port 182. The signal appearing at output port 182 is an uncorrupted, slightly attenuated version of the desired input signal at line 10a to be precorrected in the adaptive precorrection circuit 10, and is applied to the precorrection circuit 10 on line 10b. Consequently, a sample of the input signal to be precorrected is provided to the adaptive precorrection circuit without containing any corruptive components of the second signal provided to the RF combiner.

Figure 2:
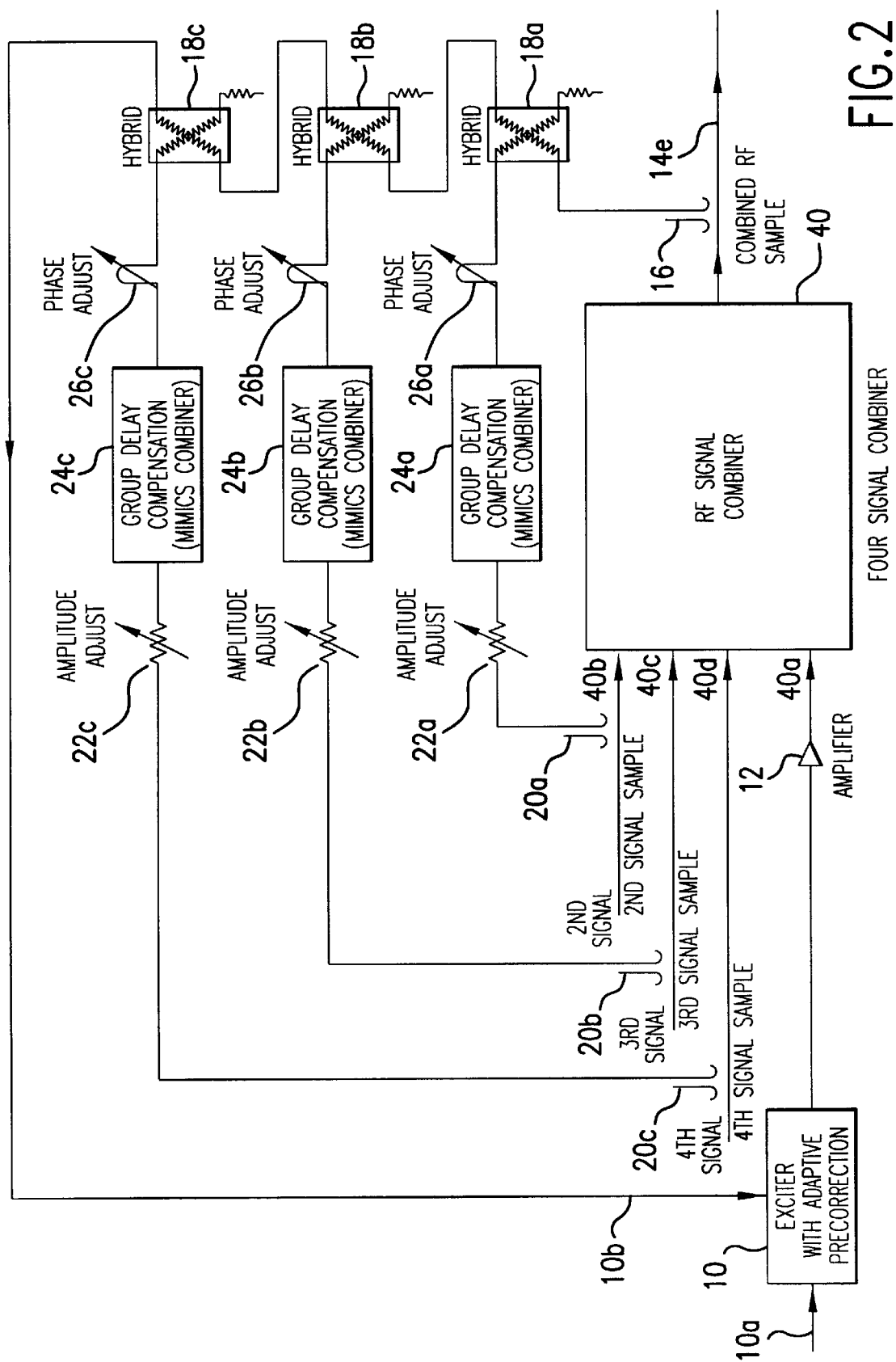
FIG. 2 is a block diagram of a correction circuit implementing the method of the present invention, according to a second preferred embodiment.

FIG. 2 is a block diagram of a second embodiment of the invention as applied to a four signal RF combiner 40. In FIG. 2, like components are labeled with like reference numerals as in FIG. 1, and will not be further described in detail. In this embodiment, the desired signal to be precorrected is inputted to the RF combiner 40 at input 40a, while second, third and four signals to be combined with the desired signal are inputted at inputs 40b–40d. Amplitude adjustment circuits 22a–22c, phase adjustment circuits 26a–26c, and group delay compensation circuits 24a–24c are provided for each of the second through fourth signals, respectively. In this embodiment, hybrids 18a, 18b and 18c are provided in a cascading configuration whereby the influence of each of the second, third and fourth signals is sequentially cancelled out from the signal sample taken at output 40e of the RF combiner 40 through coupler 16, to provide an uncorrupted, slightly attenuated sample of the desired signal at line 10b into the adaptive precorrection circuit 10.

The invention having been thus described, it will be apparent to those skilled in the art that the same may be varied in many ways without departing from the spirit and scope of the inventions. All such modifications are intended to be encompassed by the following claims.

What is claimed is:

1. A circuit for precorrecting a first signal in a broadcast signal transmitter for transmitting a combined signal on a common propagation device, comprising:

an amplifying device for amplifying a first signal to provide an amplified first signal;

an RF combiner for combining said amplified first signal with at least a second signal to provide at an output of said combiner a combined signal for propagation on a propagation device;

an adaptive precorrector for receiving said first signal at a first input thereof and precorrecting said first signal for distortions introduced into said first signal by said amplifying device and said RF combiner in accordance with a signal sample received at a second input thereof, an output of said precorrector being applied to said amplifying device; and a hybrid (hybrid junction) which receives at one input thereof a sample of said combined signal, and which receives at a second input thereof a sample of said second signal in a manner so as to provide at an output thereof a sample of said first signal constituting said signal sample provided to said adaptive precorrector.

2. The circuit of claim 1, further comprising an amplitude adjustment circuit for adjusting the amplitude of said sample of said second signal before it is applied to said hybrid.

3. The circuit of claim 1, further comprising a phase adjustment circuit for adjusting the phase of said sample of said second signal before it is applied to said hybrid.

4. The circuit of claim 1, further comprising a group delay compensation circuit for adjusting the delay of said sample of said second signal before it is applied to said hybrid.

5. The circuit of claim 1, wherein said RF combiner combines said first signal with a plurality of additional signals, said circuit further including a plurality of hybrids arranged in a cascade configuration, each hybrid receiving at one input thereof a sample of a respective one of said plurality of additional signals, and receiving at a second input thereof an output from a previous hybrid in said cascade configuration, wherein a last hybrid of said cascade configuration provides said sample of said first signal constituting said signal sample provided to said adaptive precorrector.

6. A circuit for providing a sample of a first signal to an adaptive precorrector of a transmitter which transmits a combined RF signal on a common propagation device, comprising:

an RF combiner for combining said first signal applied to a first input of said combiner with at least one additional signal applied to a second input of said combiner to provide at an output thereof said combined RF signal;

a first coupler for taking a sample of the output of said RF combiner;

a second coupler for taking a sample of said at least one additional signal at said second input; and a hybrid (hybrid junction) receiving at one input thereof the sample from said first coupler and at a second input thereof the sample from said second coupler, so as to cancel from said first coupler sample components of said at least one additional signal to provide at an output thereof a sample of said first signal to be provided to said adaptive precorrector.

7. A method for precorrecting a first signal in a broadcast signal transmitter for transmitting a combined signal on a common propagation device, comprising the steps of:

combining a precorrected first signal with at least one additional signal to provide a combined signal for propagation on a propagation device;

applying to one input of a hybrid (hybrid junction) a sample of said combined signal, applying at a second input of said hybrid a sample of said at least one additional signal in a manner so as to provide at an output of said hybrid a sample of said first signal; and applying said sample of said first signal to a precorrector which receives said first signal and precorrects said first signal, in accordance with said sample, for distortions introduced into said first signal by said RF combiner, and produces at an output thereof said precorrected first signal which is applied to said RF combiner.

8. The method of claim 7, further comprising the step of adjusting the amplitude of said sample of said additional signal before it is applied to said hybrid.

9. The method of claim 7, further comprising the step of adjusting the phase of said sample of said additional signal before it is applied to said hybrid.

10. The method of claim 7, further comprising the step adjusting the delay of said sample of said additional signal to compensate for group delay characteristics of said RF combiner, before said sample of said additional signal is applied to said hybrid.

* * * * *